United States Patent [19]

Munechika

[11] 4,068,746

[45] Jan. 17, 1978

[54] BRAKE CYLINDER DEVICE INCLUDING MEANS FOR AUTOMATICALLY COMPENSATING FOR BRAKE PAD WEAR

[75] Inventor: Kazuyoshi Munechika, Kobe, Japan

[73] Assignee: Nippon Air Brake Company Ltd., Kobe, Japan

[21] Appl. No.: 741,569

[22] Filed: Nov. 15, 1976

[30] Foreign Application Priority Data

Nov. 20, 1975  Japan .................................. 50-158111

[51] Int. Cl.² ............................................ F16D 65/74
[52] U.S. Cl. ................................. 188/196 A; 188/198
[58] Field of Search .............................. 92/13.6, 13.7; 188/196 A, 198, 351, 153 R

[56] References Cited

U.S. PATENT DOCUMENTS

| 2,234,689 | 3/1941 | Chard | 188/196 A UX |
| 3,011,315 | 12/1961 | Menichello | 188/196 A X |
| 3,125,187 | 3/1964 | Dotto | 188/196 A X |
| 3,645,362 | 2/1972 | Scheibe | 188/196 A X |

Primary Examiner—Duane A. Reger
Attorney, Agent, or Firm—R. S. Visk; R. W. McIntire, Jr.

[57] ABSTRACT

A fluid pressure operable brake cylinder device including a self-adjusting portion for automatically compensating for brake pad wear and maintaining a constant clearance between the brake pad and the braking surface of a vehicle wheel in the released disposition of the brakes.

1 Claim, 3 Drawing Figures

BRAKE CYLINDER DEVICE INCLUDING MEANS FOR AUTOMATICALLY COMPENSATING FOR BRAKE PAD WEAR

BACKGROUND OF THE INVENTION

In presently known brake cylinder devices having the self-adjusting feature to compensate for brake shoe or pad wear, a pawl and ratchet mechanism is arranged in the brake cylinder cooperatively with a sleeve member coaxially surrounding the piston rod and axially movable relative thereto. The amount of relative axial movement between the piston rod and the sleeve member is initially adjusted to an initial amount reflecting the correct clearance between the brake pads and braking surfaces on a vehicle wheel. With each successive application of the brakes, a certain amount of wear occurs on the pads, thereby causing a progressively corresponding increase in the amount of relative axial travel between the piston rod and the sleeve member, until the amount of such wear, and therefore the relative axial travel between the piston rod and sleeve member, is sufficient to cause the pawl and ratchet to make an incremental adjustment thereof. With such incremental adjustment, the amount of relative axial travel between the piston rod and the sleeve member is restored to the initial amount and, therefore, the correct clearance between the brake pads and the wheel surface is restored.

The type of self-adjusting arrangement for a brake cylinder device, as immediately above described, is objectionable in certain respects in that each adjustment is incremental, that is, the adjustment occurs after a number of brake applications until the wear on the pads has accumulated sufficiently to effect the adjustment. Thus, the brake applications occurring between points of adjustment do not provide the most efficient braking action. Moreover, due to the arrangement of the pawl and ratchet, the pawl, being spring biased into engagement with the toothed ratchet, exerts a radial force on the sleeve member which, in turn, transmits such radial force to the piston on which the sleeve member is slidably supported. The radial force thus acting on the piston transversely to and during axial movement thereof causes undesirable peripheral and uneven wear on the outer cylindrical surface of the piston.

SUMMARY OF THE INVENTION

The object of the present invention is to provide a brake cylinder device with self-adjusting means compensating for brake shoe or pad wear with each occurrence of a brake application and without subjecting the brake cylinder components to undesirable stresses and wear.

Briefly, the invention comprises, preferably, a hydraulic brake cylinder device for operating brake shoes or pads of a vehicle wheel and including a cylinder, a piston operable in said cylinder and having a release position relative to the axis thereof when the brakes are in a released state, and an axially displaceable adjusting sleeve axially spaced apart from said piston to provide a predetermined increment of relative axial movement therebetween, said sleeve being engageable by and movable with the piston, upon axial movement of the piston in excess of said predetermined increment (as a result of wear of the brake shoes or pads) for opening a one-way check valve which permits hydraulic fluid to flow behind the adjusting sleeve and accordingly adjust the axial position thereof in the cylinder, so that, upon release of the brakes, a return spring compressed between the piston and the sleeve restores them to their original spaced-apart relationship but in new respective adjusted positions in and relative to the cylinder to compensate for the amount of shoe or pad wear. Upon subsequent application of the brakes, the proper clearance will prevail between the brake shoes or pads and the wheel surface. If the shoes or pads are worn sufficiently to be replaced, a release plug is provided for releasing the hydraulic fluid behind the adjusting sleeve, thereby permitting return thereof (and of the piston) to their original positions to accommodate the new shoes or pads.

DESCRIPTION AND OPERATION

Figure 1:
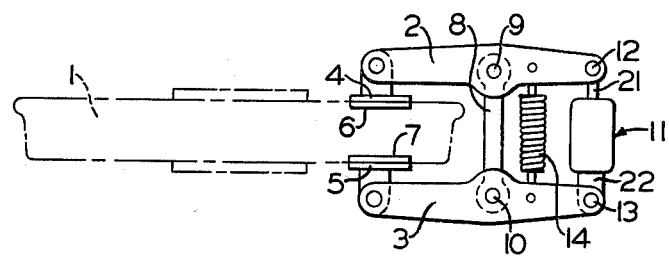
FIG. 1 is a schematic plan view, in outline, of one type of brake apparatus in which the invention may be employed.

As shown in FIG. 1, a typical brake apparatus in which the present invention may be employed for braking a vehicle wheel 1, comprises a clamp or disc-type apparatus including a pair of lever arms 2 and 3 having secured at corresponding ends thereof, in opposing relation, a pair of brake shoes or pads 4 and 5 engageable with respective braking surfaces 6 and 7 on opposite sides of the wheel. A connecting link 8 is pivotally fulcrumed at substantially mid-points 9 and 10 of lever arms 2 and 3, respectively. A brake cylinder device 11 embodying the invention is operably connected between two ends 12 and 13 of lever arms 2 and 3 opposite the ends carrying the brake pads 4 and 5, respectively. A tension spring 14 having the ends thereof connected to lever arms 2 and 3 at points between the connections of said lever arms to connecting link 8 and brake cylinder device 11, serves to draw said lever arms toward each other at the ends at which the cylinder device is connected and to spread the opposite ends apart for retracting brake pads 4 and 5 out of contact with surfaces 6 and 7, respectively, of wheel 1.

Figure 2:
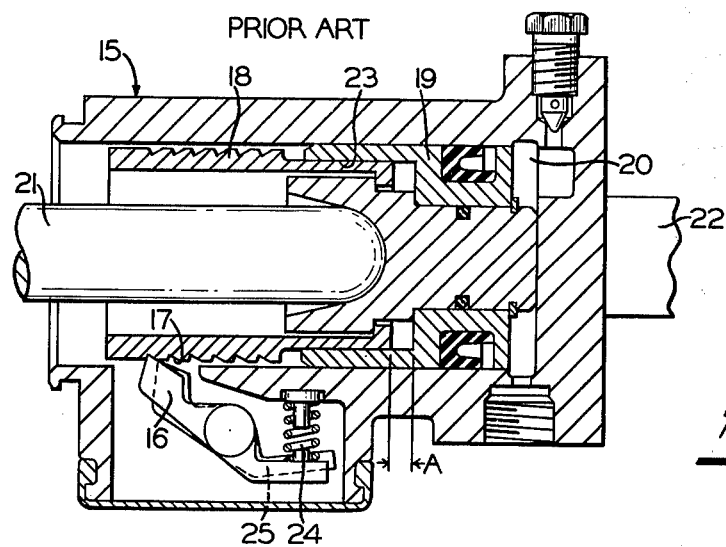
FIG. 2 is an elevational view, in section, of a brake cylinder device showing the state of the prior art.

A brake cylinder device 15, as shown in FIG. 2, is a typical representation of presently known brake cylinders employing automatic self-adjusting means in the form of a pawl finger 16 engageable with a rack 17 formed on an adjusting sleeve 18. Brake cylinder 15, which normally would be installed in place of brake cylinder device 11 in the apparatus shown in FIG. 1, includes a conventional piston 19 subjectable to fluid pressure in a pressure chamber 20 for axially displacing a piston rod 21, which would normally be pivotally connected to lever arm 2 at pivot point 12. A mounting member 22 would normally be connected to lever arm 3 at pivot point 13. Brake cylinder 15, when subjected to fluid pressure in chamber 20 for extending piston rod 21, functions in conventional manner for bringing pads 4 and 5 into frictional engagement with wheel 1.

Piston 19 is provided with a coaxial bore 23 in which one end of sleeve 18 is coaxially slidably disposed to provide relative axial movement therebetween, such relative axial movement or travel being limited to an increment designated A in FIG. 2, which is compatible to the amount of travel of the piston necessary to bring pads 4 and 5 into engagement with wheel 1 when the clearance between said pads and the wheel is normal. As pads 4 and 5 wear, piston 19 must travel a greater axial distance than increment A to bring said pads into braking contact with surfaces 6 and 7, so that, as is well known to those skilled in the art, when such piston travel exceeds the distance A to an extent equivalent to the pitch of one tooth of rack 17, pawl finger 16 drops into the next notch to restore the relative axial distance between said piston and sleeve 18 to increment A.

Pawl finger 16 is pivotally biased into the notches of rack 17 by a spring 24, which by necessity applies, through the pawl finger, a lateral force on sleeve 18 to cause uneven wear between the sliding surfaces of said sleeve and bore 23 of piston 19. Moreover, as was herein previously noted, the type of adjusting arrangement shown in FIG. 2 is objectionable in that adjustment does not occur until pads 4 and 5 have worn sufficiently to cause an incremental adjustment equivalent to the pitch of one tooth of rack 17, or, at the best, one half of such distance if a second pawl finger 25 is arranged a half tooth off pawl finger 16.

Figure 3:
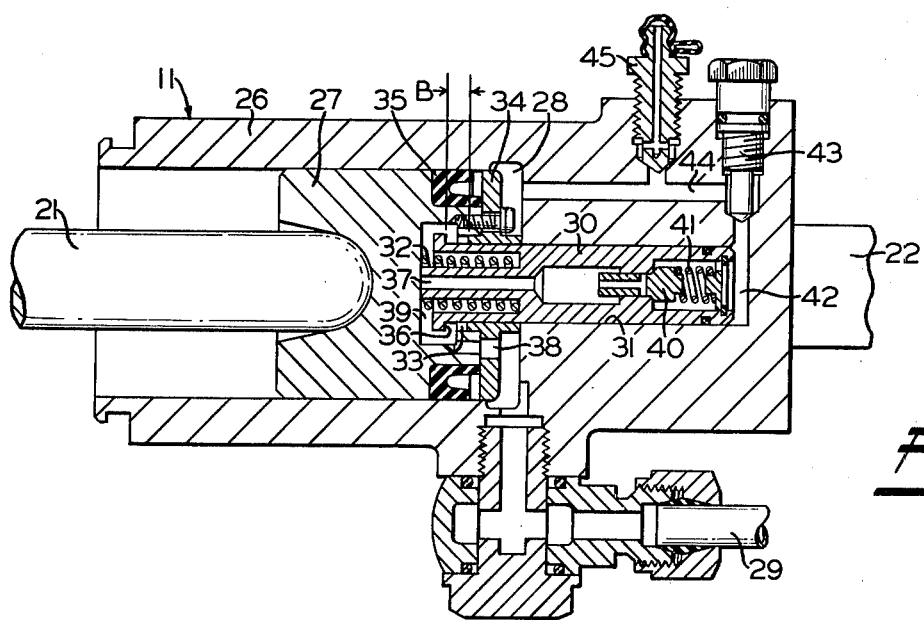
FIG. 3 is an elevational view, in section, of a brake cylinder device embodying the invention.

Self-adjusting brake cylinder device 11, as shown in FIG. 3 and embodying the invention, overcomes the objections set forth above in connection with the conventional presently known self-adjusting brake cylinder device 15, above described.

Brake cylinder device 11 is preferably a hydraulically operable device including a casing 26 with a piston 27 reciprocably disposed therein for transmitting a brake applying force through piston rod 21 and lever arms 2 and 3 to the brake pads 4 and 5, in conventional manner, when said piston is subjected to pressurized hydraulic fluid in a primary pressure chamber 28 via an inlet-outlet port 29, which may be considered as a source of fluid under pressure and via which said pressurized fluid may be supplied to or exhausted from said pressure chamber.

An adjusting sleeve 30 is axially aligned with piston 27 adjacent pressure chamber 28 and is slidably disposed in a bore 31 formed coaxially in casing 26. When in respective normal positions, in which they are shown in FIG. 3 and corresponding to a brake release disposition, piston 27 and sleeve 30 occupy a spaced-apart relationship separated by an axial increment B, which, as in the case of increment A in brake cylinder device 15, is compatible with normal clearances between brake pads 4 and 5 and surfaces 6 and 7 in said brake release disposition.

When a brake application is effected by effecting supply of pressurized hydraulic fluid to chamber 28, piston 27 is caused to travel leftwardly, as viewed in FIG. 3. A precalibrated spring 32 compressed between piston 27 and sleeve 30 acts to hold said sleeve in its normal position during leftward movement of said piston if the amount of such leftward movement does not exceed increment B. This would indicate that pads 4 and 5 have not worn an amount to warrant adjustment of sleeve 30.

If, however, due to wear of pads 4 and 5, piston 27, in order to bring the pads into braking contact with wheel 1, must travel leftwardly a greater distance than increment B, a shoulder 33 formed by an annular member 34 (secured to said piston for retaining a sealing cup 35) engages a shoulder 36 formed on sleeve 30 and thus carries the sleeve with it.

As piston 27 moves leftwardly, an adjacent end of a passageway 37 formed coaxially in sleeve 30 is opened to pressurized hydraulic fluid in primary pressure chamber 28 via an aperture 38 formed in annular member 34 to permit flow of pressurized hydraulic fluid from said primary pressure chamber to a secondary pressure chamber 39 formed on the opposite side of said annular member. Pressurized hydraulic fluid entering at the one end of passageway 37 causes a one-way check valve 40 interposed therein to be opened against the opposing force of a light valve-closing spring 41, so that pressurized hydraulic fluid may flow into an equalizing chamber 42 formed adjacent the other end of sleeve 30 to act on a pressure face at said other end, said equalizing chamber already being filled with incompressible hydraulic fluid trapped therein by said check valve from previous braking operations.

As additional incompressible pressurized hydraulic fluid is admitted into equalizing chamber 42, the axial position of sleeve 30 is accordingly adjusted leftwardly until all forces of pressurized fluid in said equalizing chamber, in primary pressure chamber 28, and in secondary pressure chamber 39, and the force of spring 32 are all in a state of equilibrium, at which point check valve 40 recloses and said sleeve assumes its newly adjusted position.

When pressurized fluid is released from chambers 28 and 39 via inlet-outlet port 29 for effecting a brake release, piston 27, through the action of tension spring 14, lever arms 2 and 3, and piston rod 21, in the usual manner, is returned to the right, whereas sleeve 30, due to pressurized incompressible hydraulic fluid in equalizing chamber 42 is retained in its newly adjusted axial position. Piston 27, therefore, resumes its normal position relative to sleeve 30, that is, spaced apart therefrom the axial distance of increment B.

It should be evident from the above description that brake cylinder device 11 eliminates unnecessary wear between the relatively moving parts, such as piston 27 and sleeve 30, due to lateral forces acting on one or the other. It should also be evident that an adjustment of the relative axial distance between piston 27 and sleeve 30, and therefore the clearance between brake pads 4 and 5 and the respective surfaces 6 and 7 of wheel 1, are adjustable with each incident of brake application (if pads 4 and 5 are worn) rather than after a certain amount of wear equivalent to one tooth of a rack has occurred, as is the case with the brake cylinder device 15 shown in FIG. 2. Brake cylinder device 11, therefore, provides more efficient, reliable, and consistent braking operation with each incident of brake application.

If the pads 4 and 5 wear to a degree that necessitates replacement of said pads, it is necessary to adjust both piston 27 and sleeve 30 in casing 26 to the right in order to provide the proper clearance between the new pads (which are thicker than the worn pads) and the braking surfaces 6 and 7 of wheel 1. To allow piston 27 and sleeve 30 to assume a most rightward position, as viewed in FIG. 3, in which sufficient clearance may be provided between the new pads and wheel 1, the trapped fluid must be released from equalizing chamber 42. For this purpose, a release plug 43 screw threaded in casing 26, may be sufficiently unscrewed from a closed position, in which communication between equalizing chamber 42 and a release passageway 44 leading to secondary chamber 39 is closed, to open said communication and thereby permit fluid in said equalizing chamber to be evacuated therefrom via said release passageway, said secondary chamber, aperture 38, primary chamber 28 and inlet-outlet port 29. When the new pads have been installed with the proper clearance from wheel 1, and piston 27 and sleeve 30 are properly axially positioned, plug 43 may be reset in its closed position. Coincidental to the first brake application subsequently to installment of the new pads, the proper relative axial positions of piston 27 and sleeve 30 will occur in the manner above described.

An air bleeder plug 45 also communicating with release passageway 44 may be opened sufficiently to allow undesirable air accumulated in the hydraulic system to be bled off.

Having now described the invention, what I claim as new and desire to secure by Letters Patent, is:

1. A brake cylinder device for use in brake apparatus and comprising:
    a. a casing;
    b. a piston reciprocably disposed in said casing and effective when axially moved in one direction out of an initial release position, in response to pressurized hydraulic fluid supplied to a primary pressure chamber formed in said casing adjacent one side of said piston, for providing an application force for the brake apparatus;
    c. a sleeve member coaxially disposed in said casing and normally occupying a spaced-apart position relative to said piston at a certain axial distance therefrom,
    d. said sleeve member being engageable by said piston for movement therewith upon movement of the piston in said one direction in excess of said certain axial distance and having a pressure face at one end thereof subjectable to hydraulic pressure in an equalizing chamber formed in the casing adjacent said pressure face, said equalizing chamber being communicable with hydraulic pressure in said primary chamber via a passageway extending coaxially through the sleeve member for effecting equalization of hydraulic fluid pressure between the two chambers;
    e. a precalibrated spring coaxially disposed between said piston and said sleeve member for biasing the piston and the sleeve member to said spaced-apart position relative to each other;
    f. positioning means for positioning said sleeve member at said certain axial distance from said piston incidentally to return of the piston to a subsequent release position, notwithstanding that said subsequent release position does not coincide with said initial release position; and
    g. a one-way check valve interposed in said passageway in said sleeve member providing flow in a direction from said primary pressure chamber to said equalizing chamber only.

* * * * *